(12) United States Patent
Matsumoto et al.

(10) Patent No.: US 7,354,108 B2
(45) Date of Patent: Apr. 8, 2008

(54) SEAT RECLINING APPARATUS

(75) Inventors: Tadashi Matsumoto, Shizuoka (JP); Mitsuo Narazaki, Shizuoka (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 98 days.

(21) Appl. No.: 11/448,732

(22) Filed: Jun. 8, 2006

(65) Prior Publication Data
US 2006/0279121 A1 Dec. 14, 2006

(30) Foreign Application Priority Data

| Jun. 9, 2005 | (JP) | ............................ 2005-168949 |
| Jun. 9, 2005 | (JP) | ............................ 2005-168950 |
| Jul. 29, 2005 | (JP) | ............................ 2005-220451 |

(51) Int. Cl.
*B60N 2/02* (2006.01)
(52) U.S. Cl. .................... 297/362; 297/353; 297/354.1; 475/180
(58) Field of Classification Search ................ 297/362, 297/366, 367, 373; 475/178, 162, 180; 403/97, 403/101
See application file for complete search history.

(56) References Cited

U.S. PATENT DOCUMENTS

| 4,371,207 | A | * | 2/1983 | Wilking et al. ......... 297/344.15 |
| 5,536,217 | A | * | 7/1996 | Droulon et al. ............. 475/177 |
| 5,611,747 | A | * | 3/1997 | Bauer et al. ................. 475/162 |
| 6,076,889 | A | * | 6/2000 | Su et al. ..................... 297/362 |
| 6,318,806 | B1 | * | 11/2001 | Levert et al. ............... 297/367 |
| 6,533,356 | B2 | * | 3/2003 | Teufel ........................ 297/362 |
| 6,579,203 | B2 | * | 6/2003 | Wang et al. ................ 475/162 |
| 7,264,566 | B2 | * | 9/2007 | Dill et al. .................... 475/164 |

FOREIGN PATENT DOCUMENTS

| FR | 2 759 333 A1 | 8/1998 |
| JP | 2000-166679 A | 6/2000 |
| JP | 2004-229951 A | 8/2004 |

* cited by examiner

*Primary Examiner*—Victor Batson
*Assistant Examiner*—Patrick D Lynch
(74) *Attorney, Agent, or Firm*—Foley & Lardner LLP

(57) ABSTRACT

A seat reclining apparatus includes an internal gear, an external gear, an eccentric drive mechanism, and a base plate. The internal gear is secured to a seatback arm. The external gear includes an external tooth portion being in meshing contact with the internal gear, the external tooth portion having a smaller number of teeth than the internal gear. The eccentric drive mechanism rotates the external gear with respect to the internal gear in meshing contact with the internal gear. The base plate is secured to a seatcushion arm. The base plate includes an internal tooth portion press-fitted to the external tooth portion of the external gear. The internal tooth portion of the base plate includes a part press-fitted to the external tooth portion of the external gear and a part loose-fitted to the external tooth portion of the external gear.

10 Claims, 9 Drawing Sheets

SEAT RECLINING APPARATUS

BACKGROUND OF THE INVENTION

The present invention relates generally to a seat reclining apparatus, and more particularly to a seat reclining apparatus of a round type that has a round speed-reduction mechanism comprising an internal gear, and an external gear having a smaller number of teeth than the internal gear, where the external gear rotates with respect to the internal gear in meshing contact with the internal gear.

In recent years, there are proposed and developed round-type seat reclining apparatuses for automotive vehicle with a round differential mechanism through which a seatback is rotated by means of an electric motor with a high gear ratio. Japanese Published Patent Application No. 2000-166679 and French Published Patent Application No. 2759333 show such round-type seat reclining apparatuses that comprise a base plate secured to a seatcushion arm, an internal gear secured to a seatback arm, an external gear secured to the base plate and meshed with the internal gear where the number of teeth of the external gear is one or two smaller than that of the internal gear, an eccentric drive mechanism that rotates the external gear with respect to the internal gear so that the meshing site therebetween moves circumferentially, and a holder ring that binds and supports the base plate, the external gear, and the internal gear. On the other hand, Japanese Published Patent Application No. 2004-229951 shows a structure for eliminating a play between the internal gear and the external gear, where the structure includes a pair of wedge members which is employed with a spring member and a center shaft to eccentrically drive the external gear in meshing contact with the internal gear.

SUMMARY OF THE INVENTION

In such a round-type seat reclining apparatus as disclosed in Japanese Published Patent Application No. 2000-166679 or French Published Patent Application No. 2759333, the base plate includes an internal tooth portion adapted to be press-fitted to the external gear. The load needed to press-fit the external gear into the base plate varies significantly due to variation in the dimensions of the external gear and those of the internal tooth portion of the base plate. If small clearances are provided therebetween in order to control the variation of the press-fitting load, the clearances may cause a play in the circumferential direction between the base plate and the external gear. Further, if the above seat reclining apparatus is combined with Japanese Published Patent Application No. 2004-229951, the modified seat reclining apparatus should be assembled by installing the pair of wedge members, the spring member, and the center shaft under condition that the internal gear is in meshing contact with the external gear, and finally press-fitting the external gear to the base plate. If the load needed for the press-fitting is large, it is possible that the external gear is incompletely press-fitted to the base plate to cause an axial gap therebetween or that the large load causes deformation of the base plate and the internal gear. Accordingly, it is an object of the present invention to provide a round-type seat reclining apparatus which can be assembled with a small load for press-fitting, and which has no play in the circumferential direction between the base plate and the external gear.

Further, such a seat reclining apparatus as disclosed in the above documents has a sandwich structure where the external gear is arranged between the base plate and the internal gear. The external gear is press-fitted to the base plate. In order to absorb variation in the axial dimensions, a clearance is provided between the base plate and the external gear in the axial direction. If the seat reclining apparatus is exposed to an excessive load, it is possible that the external gear moves away from the internal gear so that the effective length of meshing contact therebetween decreases to reduce the capacity of torque therebetween. Accordingly, it is an object of the present invention to provide a round-type seat reclining apparatus which can prevent the external gear from moving away from the internal gear in the axial direction.

In such a seat reclining apparatus as disclosed in Japanese Published Patent Application No. 2000-166679 or French Published Patent Application No. 2759333, the external gear generally consists of two parts, where one part is press-fitted to the base plate and the other part is meshed with the internal gear. This tends to increase the size of the external gear. If the external gear generally consists of one part formed by press forming, the external gear is formed with a shear-dropped peripheral portion 110a on the side of press drawing as shown in FIGS. 11A and 11B. If the face of the external gear 110 including the shear-dropped peripheral portion 110a is press-fitted to the base plate incorrectly, the length of contact between the external gear and the base plate is smaller than desired. This reduces the strength of the press-fitting therebetween. After assembly, it is impossible to detect incorrect installation of the external gear 110, since the inside cannot be checked. Accordingly, it is an object of the present invention to provide a seat reclining apparatus where incorrect installation of the base plate can be easily detected.

According to one aspect of the present invention, a seat reclining apparatus comprises: an internal gear adapted to be secured to one of a seatback and a seatcushion; an external gear including an external tooth portion being in meshing contact with the internal gear, the external tooth portion having a smaller number of teeth than the internal gear; an eccentric drive mechanism adapted to rotate the external gear with respect to the internal gear in meshing contact with the internal gear; and a base plate adapted to be secured to another of the seatback and the seatcushion, the base plate including an internal tooth portion press-fitted to the external tooth portion of the external gear, and the internal tooth portion of the base plate comprising a part press-fitted to the external tooth portion of the external gear and a part loose-fitted to the external tooth portion of the external gear. The internal tooth portion of the base plate may include a plurality of the press-fitted parts arranged circumferentially and spaced substantially uniformly. The press-fitted parts of the internal tooth portion of the base plate may be arranged circumferentially at intervals of about 120 degrees. The base plate may include a cylindrical hollow where the internal tooth portion is formed, and the base plate may include a raised or lifted portion formed on a bottom of the cylindrical hollow, the raised portion extending to the external gear. The base plate may further include a hexagonal hollow formed in the bottom of the cylindrical hollow, and the raised portion may be formed on each of six edges defining the hexagonal shape of the hexagonal hollow. The base plate may include a chamfering formed between the bottom of the cylindrical hollow and the internal tooth portion, and the raised portion of the base plate may be formed extending higher toward the external gear than the chamfering. The raised portion of the base plate may be formed by embossing. The external gear may include a joined tooth part comprising at least two teeth of the external tooth portion and a portion bridging at least one gap between the at least two teeth on a side press-fitted to the base plate, and the internal tooth portion of the base plate may include a blank part accommodating the joined tooth part of the external gear. The external gear may include a plurality of the joined tooth parts, and the internal tooth portion of the base plate may include a plurality of the blank parts each accommodating a respective one of the joined tooth parts of the external gear. The external gear may be formed by press forming, and the external gear may include a shear-dropped peripheral portion on one side and the joined tooth part on another side.

BRIEF DESCRIPTION OF THE DRAWINGS

FIG. 11A shows a plan view and FIG. 11B shows a side view.

DETAILED DESCRIPTION OF THE INVENTION

The following describes a seat reclining apparatus in accordance with an embodiment with reference to FIGS. 1 to 6, and 10. The seat reclining apparatus is arranged between a seatcushion arm of a seatcushion assembly and a seatback arm of a seatback assembly, and configured to adjust the angle of inclination of the seatback arm with respect to the seatcushion arm, and thereby to adjust the angle of inclination of the seatback assembly with respect to the seatcushion assembly.

Figure 1:
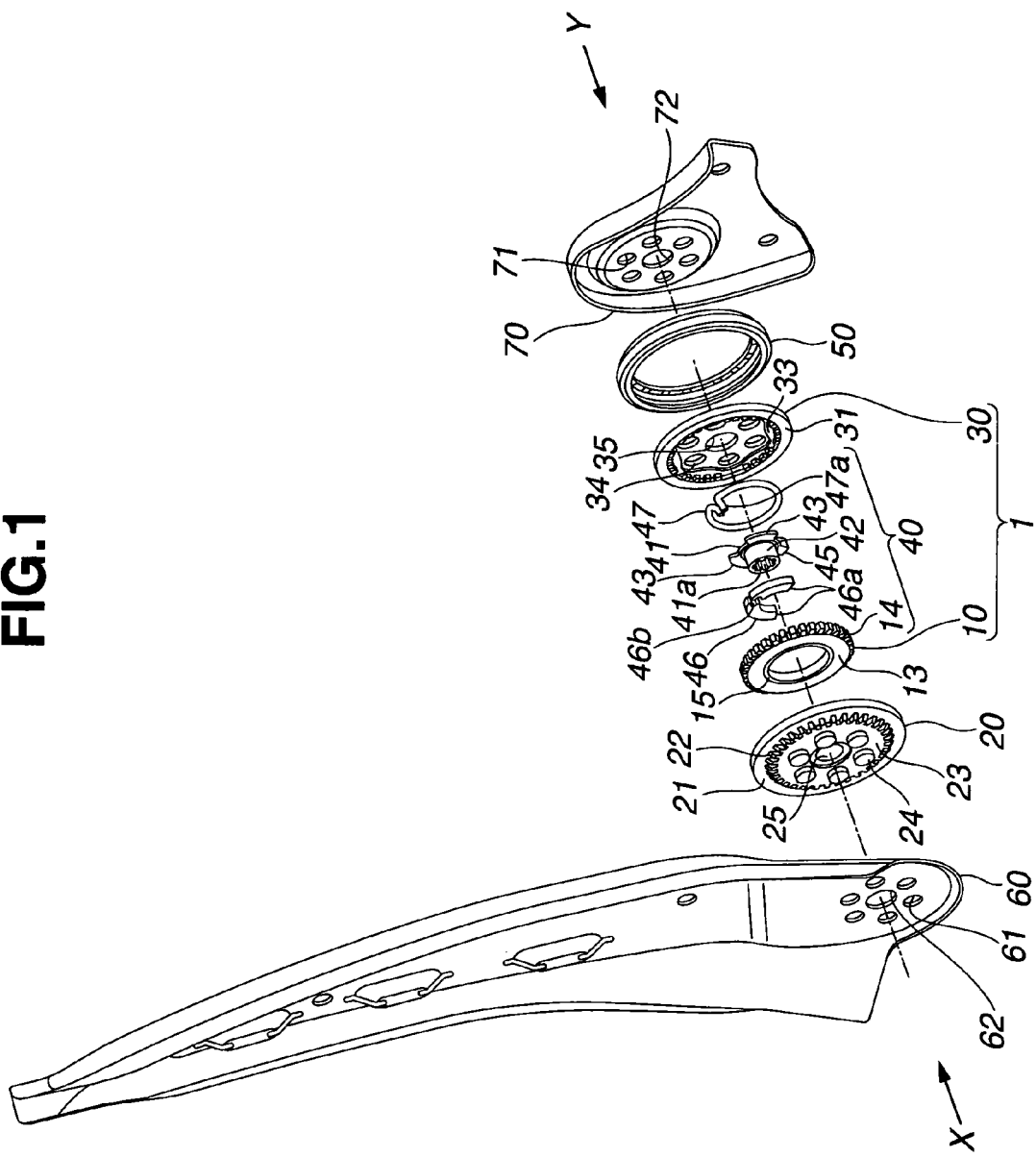
FIG. 1 is an exploded perspective view of a seat reclining apparatus in accordance with an embodiment of the present invention.

As shown in FIG. 1, the seat reclining apparatus generally comprises a base unit 1 secured to a seatcushion arm 70, an internal gear 20 secured to a seatback arm 60, and an eccentric drive mechanism 40. The base unit 1 comprises an external gear 10 having external teeth on its outer peripheral face, and a base plate 30 secured directly to the seatcushion arm 70, where the external gear 10 is secured to the base plate 30 by press-fitting. The eccentric drive mechanism 40 comprises a center shaft 41, a pair of lock plates 46, and a lock spring 47. The center shaft 41 is adapted to be driven by an electric motor not shown. The seat reclining apparatus further comprises a holder ring 50 surrounding the outer peripheral face of a stack of the internal gear 20, the external gear 10, and the base plate 30.

As shown in FIG. 1, the external gear 10 is generally ring-shaped, comprising an outer peripheral face over the whole of which external teeth 14 is formed, an inner peripheral face to which a cylindrical metal bearing 15 is press-fitted, and flat faces 13 located between the inner and outer peripheral faces. As shown below, one side (right side along the arrow "X" or "Y" in FIG. 1) of the external gear 10 is adapted to be press-fitted to an internal tooth portion 38 of the base plate 30, while the other side (left side in FIG. 1) of the external gear 10 is adapted to mesh with the internal gear 20.

Figure 4:
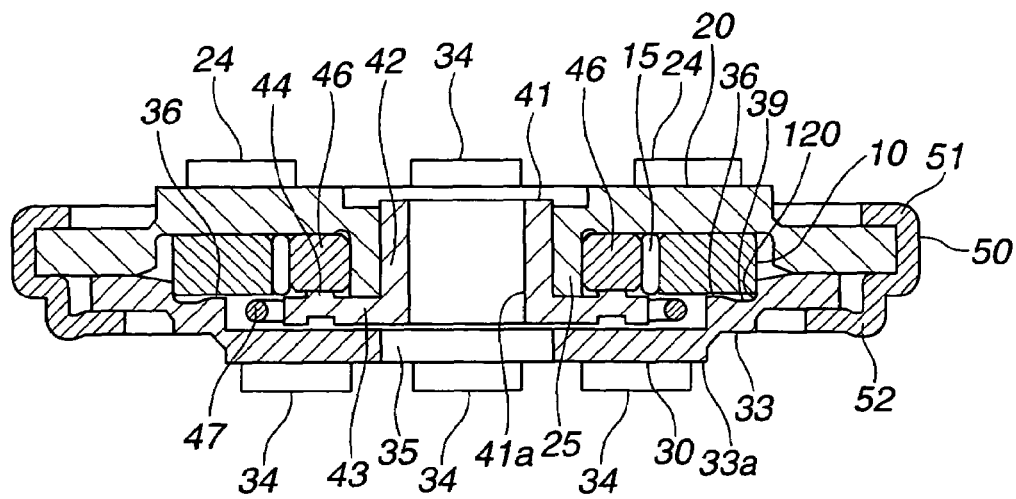
FIG. 4 is a sectional view of the seat reclining apparatus taken along the plane indicated by the line IV-IV of FIG. 2.

As shown in FIG. 1, the internal gear 20 is generally formed in the shape of a disc having a coaxial cylindrical hollow, comprising an outer peripheral face having a larger diameter than the base plate 30, internal teeth 22 formed on the peripheral face of the cylindrical hollow, and a portion 23 outwardly cylindrically projected in the opposite direction to the bottom face of the cylindrical hollow, i.e. in the direction of the arrow "Y" in FIG. 1. The number of teeth of the internal gear 20 is designed to be one or two greater than that of external gear 10. Accordingly the pitch diameter of the internal gear 20 is larger than that of the external gear 10. Formed by embossing on the outwardly projected portion 23, six cylindrical projections 24 are arranged circumferentially. The cylindrical projections 24 are adapted to be fitted and coupled by welding to six holes 61 formed in the seatback arm 60. A boss 25 is also formed in the center of the outwardly projected portion 23, extending internally in the direction of the arrow "X" of FIG. 1 as shown in FIG. 4. The boss 25 rotatably supports a shaft portion 42 of the center shaft 41. With the cylindrical projections 24 fitted to the holes 61, the boss 25 is positioned identical to a center hole 62 formed in the center of the holes 61 in the seatback arm 60.

Figure 2:
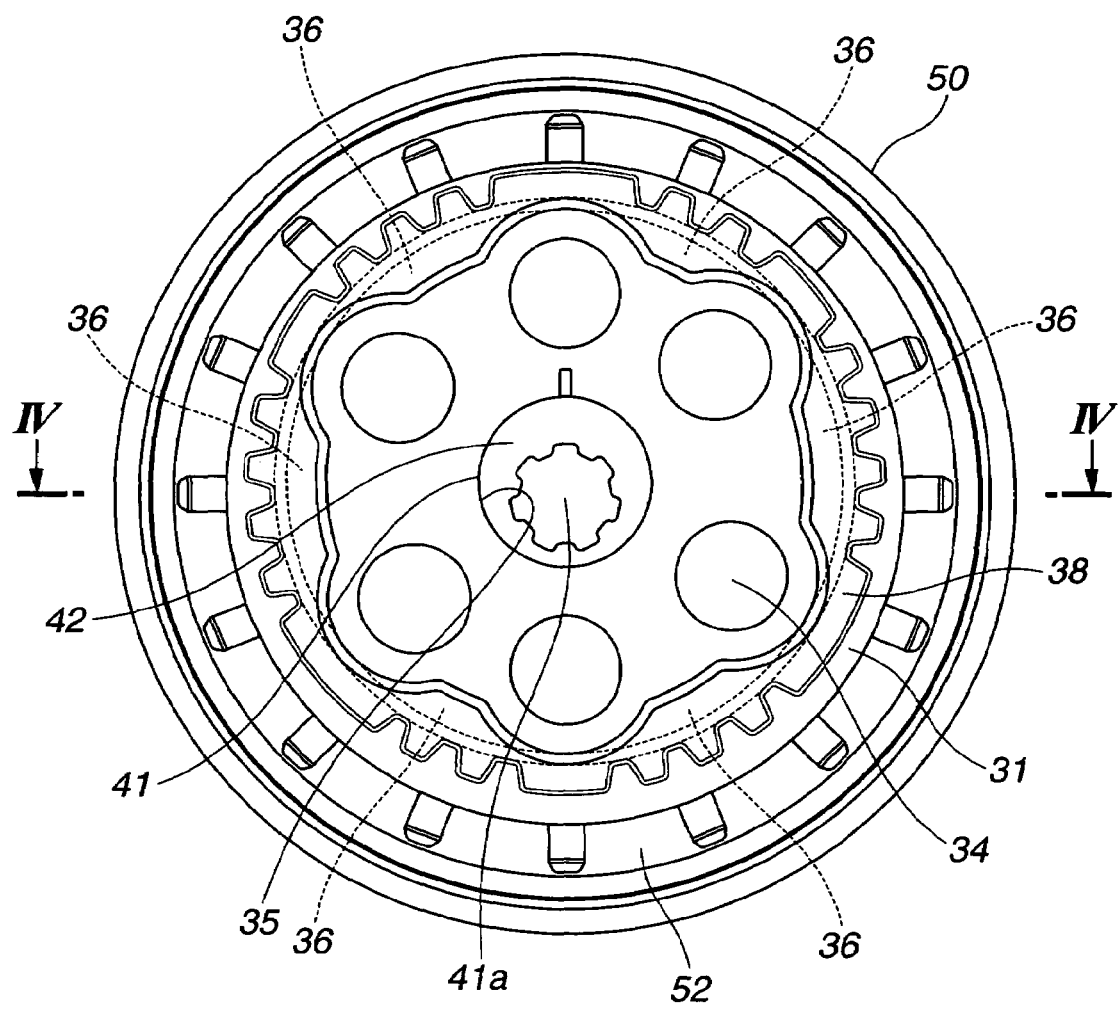
FIG. 2 is a plan view of the seat reclining apparatus taken in the direction of the arrow indicated by "Y" in FIG. 1.
Figure 3:
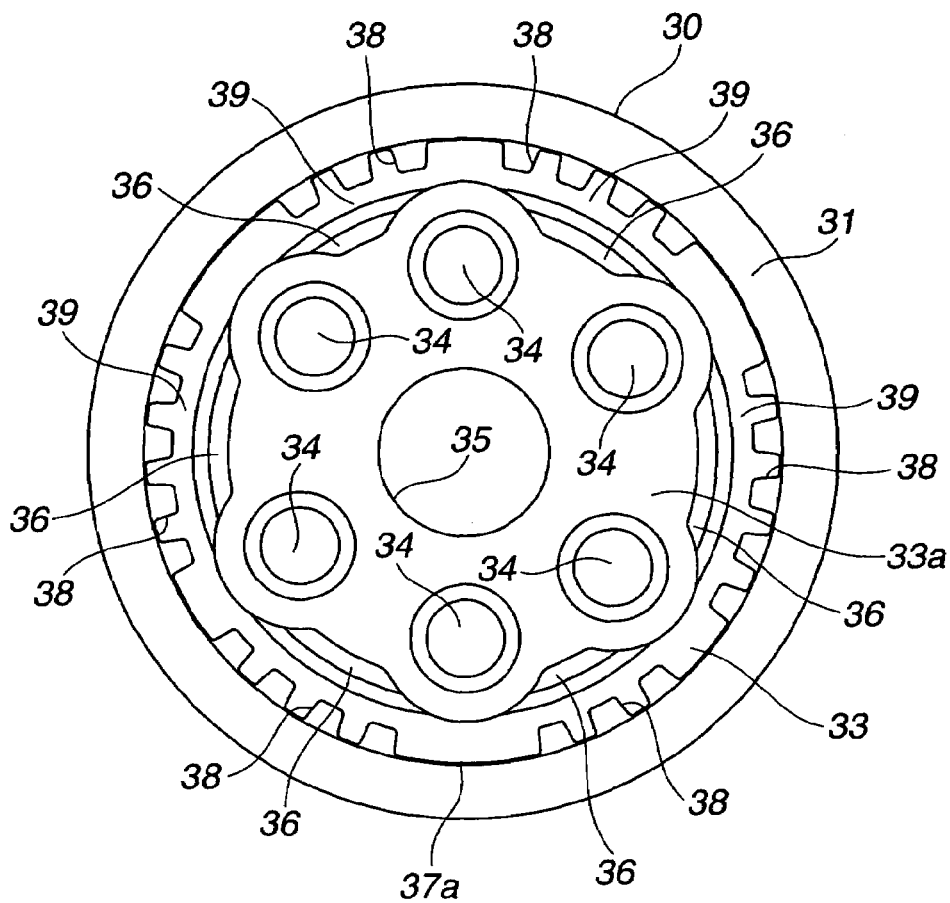
FIG. 3 is an isolated plan view of a base plate of the seat reclining apparatus taken in the direction of the arrow indicated by "X" in FIG. 1.

As shown in FIG. 1, the base plate 30 is generally formed in the shape of a disc having a coaxial cylindrical hollow, comprising an outer peripheral face having a little smaller diameter than the internal gear 20, an internal tooth portion 38 formed with internal teeth on the peripheral face of the cylindrical hollow, and a portion 33 cylindrically projected in the opposite direction to the bottom face of the cylindrical hollow, i.e. in the direction of the arrow "X" in FIG. 1. Formed by embossing on the cylindrically projected portion 33, six cylindrical projections 34 are arranged circumferentially. The cylindrical projections 34 are adapted to be fitted and coupled by welding to six holes 71 formed in the seatcushion arm 70. A center hole 35 is also formed in the center of the cylindrically projected portion 33, and is positioned identical to a center hole 72 formed in the center of the holes 71 in the seatcushion arm 70 with the cylindrical projections 34 fitted to holes 71. As shown in FIGS. 2, 3, and 4, the bottom face 39 of the cylindrical hollow on the opposite side to the cylindrically projected portion 33 is formed with raised portions 36 which are raised from the bottom face 39 toward the external gear 10 in such a manner to be in contact with the flat face 13 of external gear 10.

As shown in FIGS. 2 and 4, the base plate 30 further includes a hexagonal second projected portion 33a in the cylindrically projected portion 33 while the cylindrical hollow is formed with a hexagonal hollow in the bottom face. As shown in FIG. 2, the six raised portions 36 are formed each defining a respective one of the edges of the hexagonal hollow, while the six cylindrical projections 24 are each formed near a respective one of the apexes of the hexagonal hollow of the second projected portion 33a. As shown in FIG. 4, the height of each raised portion 36 is designed to be higher than the chamfering 120 formed between the bottom face 39 of the cylindrical hollow and the internal tooth portion 38.

As shown in FIG. 4, the external gear 10 has just a little smaller thickness than the sum of the depth of the cylindrical hollow of the internal gear 20 and the depth of the cylindrical hollow of the base plate 30. Accordingly, when the internal gear 20, the external gear 10, and the base plate 30 are assembled, there is no gap between the outer peripheral portion 21 of the internal gear 20 and the outer peripheral portion 31 of the base plate 30. In assembling the above arrangement, the external teeth 14 of the external gear 10 is press-fitted to the internal tooth portion 38 of the base plate 30 after the eccentric drive mechanism 40 is installed. As shown in FIG. 14, the bottom end of the external teeth 14 of the external gear 10 reaches a position above the top end of the chamfering 120. This causes a gap between one flat face 13 of the external gear 10 and the bottom face of the base plate 30 in case the raised portions 36 of the base plate 30 are not provided. Thus the raised portions 36 of the base plate 30 serve for reducing the gap therebetween. The raised portions 36 allows forming the chamfering 120 between the internal tooth portion 38 of the base plate 30 and the bottom face 39 of the base plate 30, and thereby serves for preventing stress concentration and enhancing the strength of the base plate 30 and enhancing the lifetime of the mold thereof.

Figure 6:
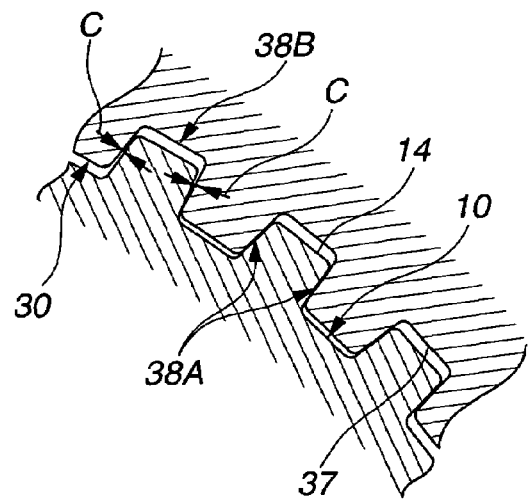
FIG. 6 is a plan view of a site of the seat reclining apparatus where an external gear engages with an internal tooth portion of the base plate.

As shown in FIG. 6, formed in the internal tooth portion 38 of the base plate 30, internal teeth 37 comprises press-fitted tooth parts 38A into which the external teeth 14 of the external gear 10 is press-fitted with no clearance, and loose-fitted (clearance-fitted) tooth parts 38B into which the external teeth 14 is loose-fitted with a clearance C. Three press-fitted tooth parts 38A are formed and arranged circumferentially at intervals of about 120 degrees in the peripheral face of the cylindrical hollow of the base plate 30. The press fitting at the press-fitted tooth parts 38A is achieved by reducing the width between the contact faces of an associated tooth of the internal tooth portion 38. This may be achieved by increasing the width between contact faces of an associated tooth of the external gear 10. As shown in FIG. 3, the internal tooth portion 38 includes six blank parts 37a having no tooth such a manner to provide the space needed to allocate each cylindrical projection 34. The internal teeth 37 may be formed all over the peripheral portion of the cylindrical hollow of the base plate 30 without the blank parts 37a.

Figure 5:
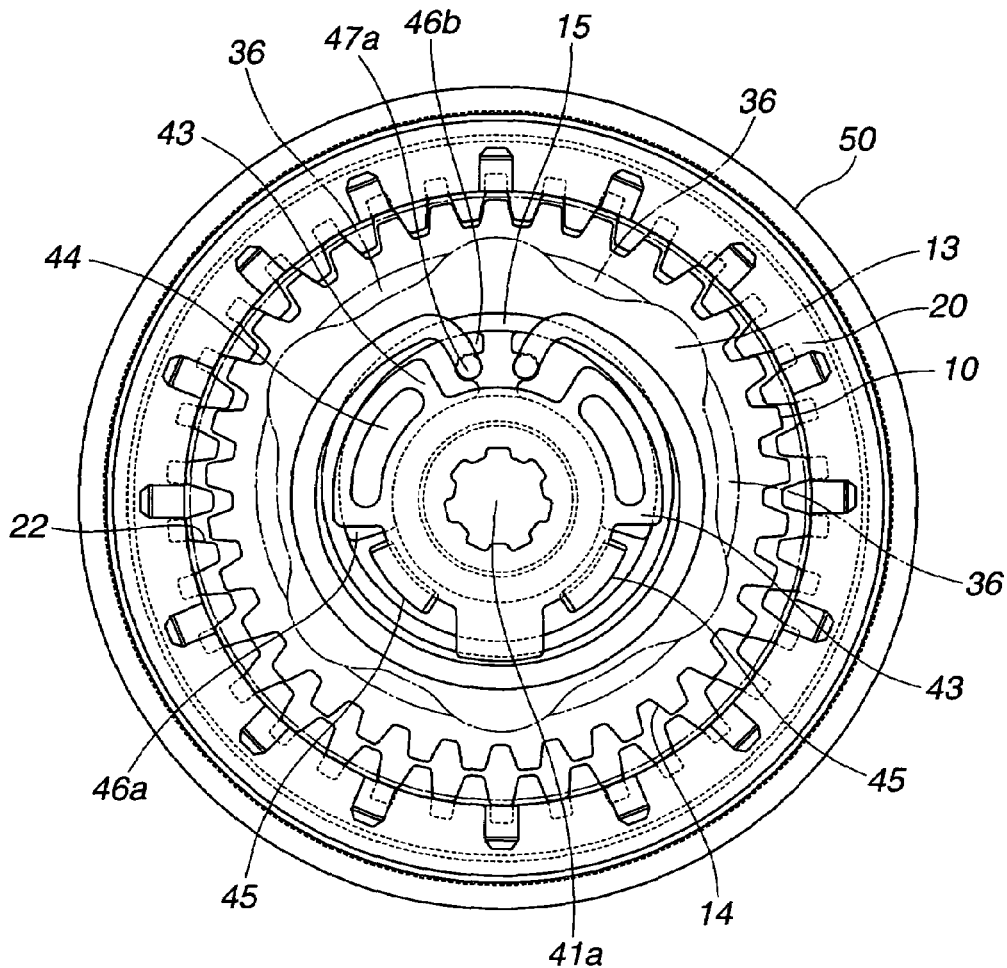
FIG. 5 is a plan view of the seat reclining apparatus taken in the direction of the arrow indicated by "Y" in FIG. 1, where the base plate is removed.
Figure 10:
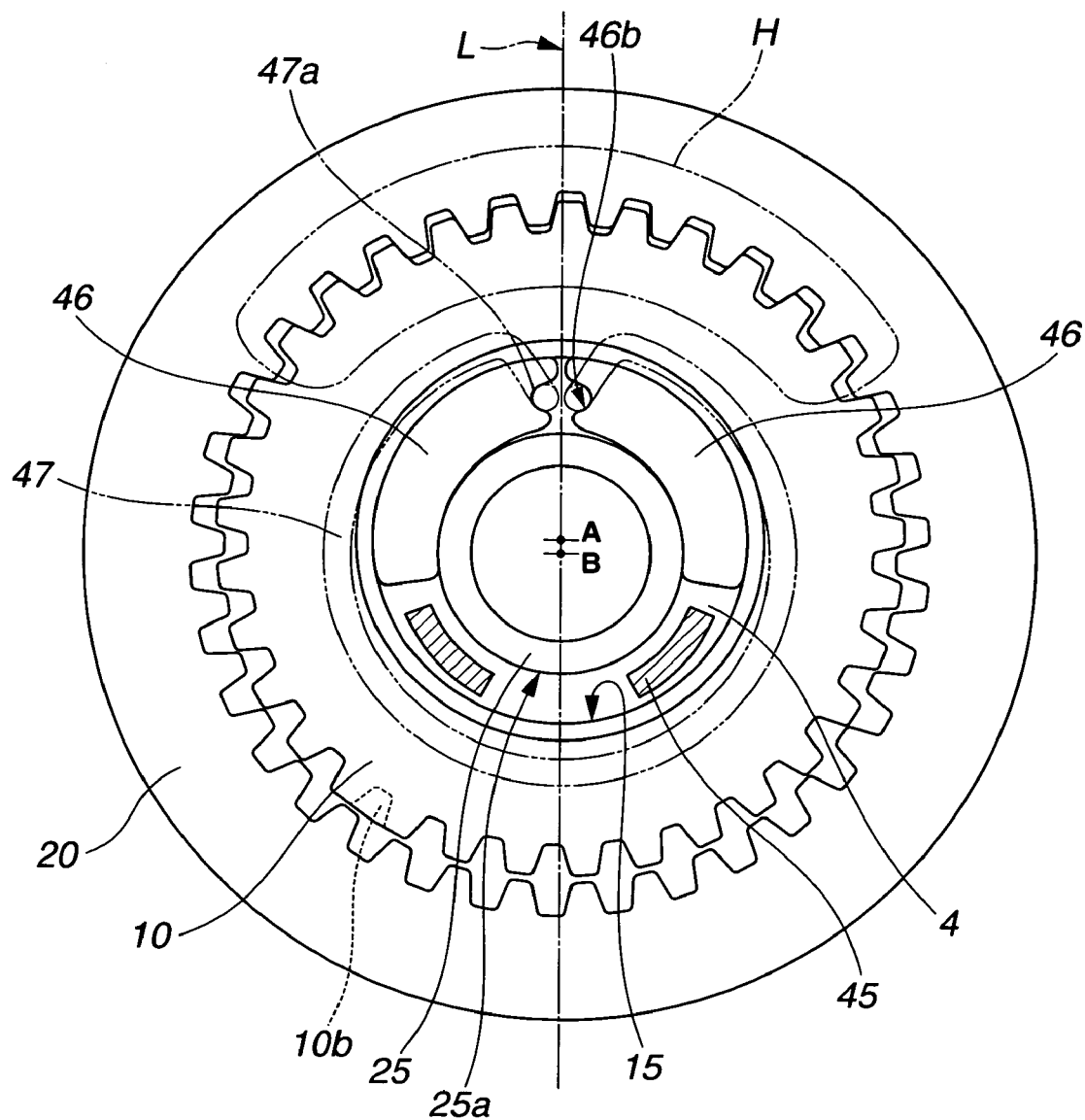
FIG. 10 is a view illustrating an operating mechanism of the seat reclining apparatus.
Figure 11B:
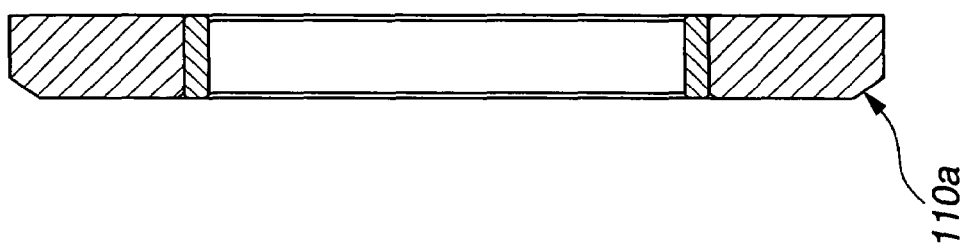
FIGS. 11A and 11B are views of a comparative example of external gears for seat reclining apparatus, where
Figure 11A:
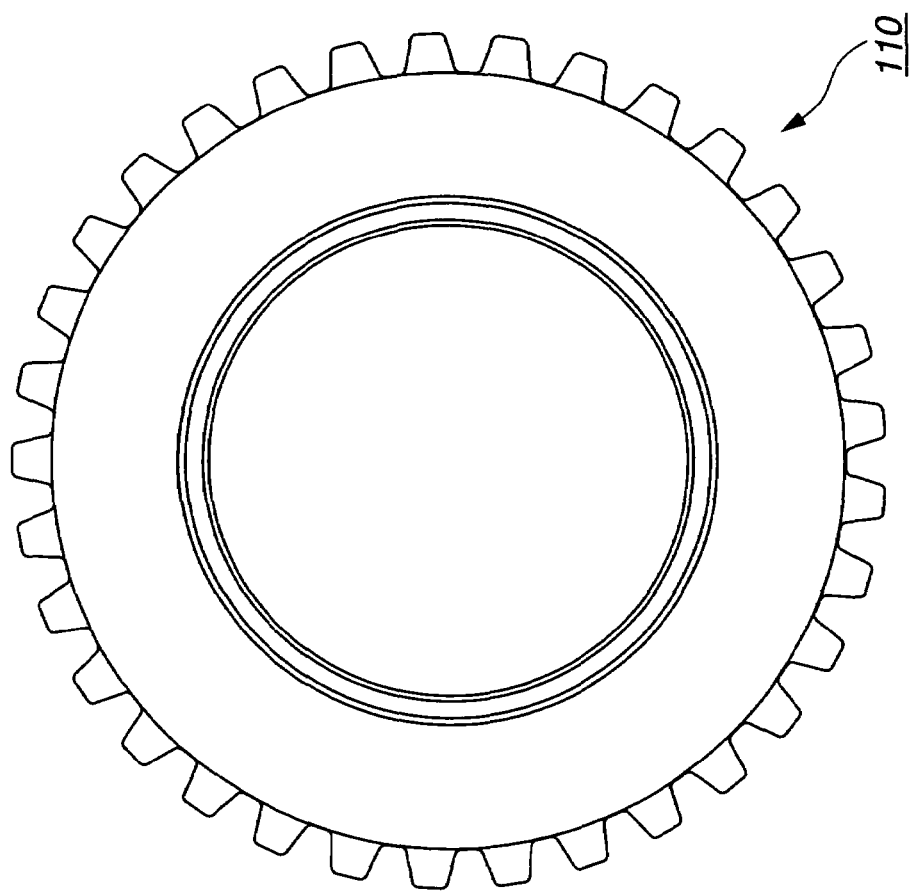

As shown in FIGS. 1 and 4, the center shaft 41 generally comprises a shaft portion 42, a flange portion 43, a pair of pusher elements 45, a lock plate stopper portion 44, and a portion defining a splined bore 41a. As shown in FIG. 4, the shaft portion 42 is cylindrically shaped to be rotatably fitted to the inner peripheral face of the boss 25 of the internal gear 20. The flange portion 43 is formed integrally with one end of the shaft portion 42, radially extending and facing the second projected portion 33a of the base plate 30. As shown in FIG. 1, each pusher element 45 is extending axially from the flange portion 43 and is adapted to be in contact with the tip 46a of an associated one of lock plates 46 which are each formed in the shape of a curved wedge and inserted into the eccentric space defined between the boss 25 of the internal gear 20 and the metal bearing 15 press-fitted into the hole of the external gear 10. The lock plate stopper portion 44 is formed integrally with the flange portion 43 and is in contact with the lock plates 46 to prevent each lock plate 46 from moving in a releasing direction (downward in FIG. 4). As shown in FIG. 5, the two lock plates 46 are located in a thicker portion of the eccentric space formed between the outer peripheral portion of the boss 25 and the inner peripheral portion of the metal bearing 15. The two lock plates 46 are biased away from each other to increase the eccentricity between the boss 25 and the metal bearing 15, i.e. to increase the eccentricity between the internal gear 20 and the external gear 10. The splined bore 41a is adapted to receive an input shaft coupled to a motor, specifically including a plurality of grooves circumferentially arranged to extend axially to transmit a torque from the input shaft to the shaft portion 42. As shown in FIG. 10, under condition that the shaft portion 42 of the center shaft 41 is inserted into the boss 25, each pusher element 45 is mounted within the eccentric space 4, and specifically located near the thinner end of the lock plate 46.

As shown in FIGS. 1 and 4, the holder ring 50 includes a portion 51 for covering the outer peripheral portion 21 of the internal gear 20 and thus integrally supporting the internal gear 20, and a portion 52 for supporting the base plate 30 via the outer peripheral portion 31 and preventing the base plate 30 from moving along the axial direction. As shown in FIG. 4, the portion 52 of the holder ring 50 has the form of a stepped cylindrical shape. The portion 51 is cylindrically shaped before assembly, and the end of the portion 51 is bent at a right angle by drawing after assembly of the base unit 1 and the internal gear 20. Thus, the holder ring 50 serves to bind or support the base unit 1 and the internal gear 20 for relative rotation, restricting the relative axial movement of them.

The seat reclining apparatus as above described operates under condition that the cylindrically projected portion 33 of the base plate 30 is secured to the seatcushion arm 70, the outwardly projected portion 23 of the internal gear 20 is secured to the seatback arm 60, and the center shaft 41 is driven by the output shaft of a motor unit. The number of teeth of the external gear 10 is defined to be one or two smaller than that of the internal gear 20, while the pitch diameter of the external gear 10 is smaller than that of the internal gear 20. The center of the external gear 10 and the center of the internal gear 20 are deviated from each other in order to mesh the internal teeth 22 with the external teeth 14. When the meshing site is moved circumferentially, the external gear 10 rotates with respect to the internal gear 20 by the angle equivalent to the difference in the number of teeth per one rotation. Specifically, in this embodiment, as shown in FIG. 10, the number of teeth of the external gear 10 is 33, while that of the internal gear 20 is 34. Thus, the internal gear 20 has one more gear teeth than the external gear 10. This results in that the center point A of the external gear 10 is in an upward eccentric position with respect to the center point B of the internal gear 20 so that the external gear 10 and the internal gear 20 meshes with each other at the top end under condition of FIG. 10.

As shown in FIG. 10, the eccentric drive mechanism 40 is provided to circumferentially move the meshing site H where the external gear 10 and the internal gear 20 meshes with each other. The eccentric drive mechanism 40 is configured as follows. As shown in FIG. 10, the internal gear 20 includes the boss 25, while the external gear 10 includes the metal bearing 15. The outer peripheral face 25a of the boss 25 and the metal bearing 15 define an eccentric annular space 4. The pair of lock plates 46 is disposed in the eccentric space 4. During rotational movement along the eccentric space 4, the lock plates 46 press the corresponding portion of the external gear 10 toward the internal gear 20, and the center point A of the external gear 10 revolves around the center point B of the internal gear 20. The meshing site H is defined closer to the lock plates 46, and revolves in accordance with the position of the lock plates 46.

Although the lock plates 46 may be replaced with a single lock plate, it is possible that variation in the actual size of the lock plate 46 causes variation in the backlash in the meshing site H. In this embodiment, the two lock plates 46 are biased away from each other by a lock spring 47. The lock spring 47 is housed within the cylindrical hollow of the second projected portion 33a of the base plate 30, having tips 47a which are each bent at a right angle. Each lock plate 46 includes a notch portion 46b at the thicker end portion which is engaged with the tip 47a of the lock spring 47. As shown in FIG. 10, the pair of lock plates 46 is disposed within the eccentric space 4 with the thicker end closer to each other. The pair of lock plates 46 is biased away from each other by the biasing force of the lock spring 47, serving as wedges to increase the distance between the center point A of the external gear 10 and the center point B of the internal gear 20. In this situation, the lock plates 46 are located with no gap between the boss 25 and the external gear 10. Thus, in FIG. 10, the external gear 10 is pushed upward toward the internal gear 20, strengthening the degree of meshing, and minimizing the backlash. During operation, one of the pusher elements 45 of the center shaft 41 presses an associated one of the lock plates 46 so that the lock plate 46 does not wedge into the narrower space, resulting in smooth rotational movement of the lock plates 46. The lock plate support portion 44 of the flange 43 of the center shaft 41 is extending to cover the side face of the lock plate 46 and thereby to prevent the lock plate 46 from falling toward the base plate 30.

The pair of lock plates 46 is moved by the center shaft 41 to travel circumferentially within the eccentric space 4. The center shaft 41 presses the thinner end of one of the lock plates 46 in the circumferential direction and thereby rotates the same. When the pair of lock plates 46 rotates once along the circumference, the internal gear 20 moves by one tooth with respect to the external gear 10 in the opposite direction to the direction of rotation of the center shaft 41. Thus, the internal gear 20 is rotated with respect to the base unit 1 at a speed that is obtained by reducing the rotational speed of the center shaft 41 in the same direction with a high gear ratio. Specifically, when the center shaft 41 rotates in one direction in accordance with the rotation of the motor, an associated one of the pusher elements 45 presses an associated one of the lock plates 46 in the direction from the thinner end to the thicker end. Upon this, the lock spring 47 is a little compressed to press the other lock plate 46 in the same direction. Thus, the pair of lock plates 46 revolves circumferentially within the eccentric space 4 without gaps between the associated parts. As a result, the meshing site H in which the internal gear 20 meshes with the external gear 10 and which is defined closer to the lock plates 46 moves circumferentially. When the meshing site H revolves once, the internal gear 20 rotates by a degree of one tooth in the same direction as the lock plates 46 and the meshing site H with respect to the external gear 10, since the number of teeth of the internal gear 20 is one higher than that of the external gear 10. In this manner, when the center shaft 41 is rotated, the internal gear 20 rotates integrally with the seatback arm 60 with respect to the base unit 1 secured to the seatcushion arm 70 at a speed which is in the same direction as the center shaft 41 and is obtained by reducing with a high gear ratio.

The following describes a process of assembly of the seat reclining apparatus. First, the external gear 10 is disposed within the cylindrical hollow of the internal gear 20 in such a manner that the internal teeth 22 of the internal gear 20 meshes with the external teeth 14 of the external gear 10. Second, the pair of lock plates 46 is disposed within the thicker portion of the eccentric space 4 defined between the boss 25 of the internal gear 20 and the metal bearing 15 of the external gear 10. Third, the shaft portion 42 of the center shaft 41 is inserted into the boss 25 of the internal gear 20 in such a manner that the pusher elements 45 of the center shaft 41 is inserted into the thinner portion of the eccentric space 4. Fourth, the end portions 47a of the lock spring 47 is inserted into the notched portion of the flange 43 of the center shaft 41 and into the space between the thicker ends 46b of the lock plates 46. Under the above condition, the base plate 30 is disposed to close the cylindrical hollow of the internal gear 20 in such a manner that the external teeth 14 of the external gear 10 is press-fitted to the internal tooth portion 38 of the base plate 30. Finally, the holder ring 50 is combined with the above assembly to support the outer peripheral portion of the base plate 30 and the internal gear 20.

Since the internal tooth portion 38 of the base plate 30 comprises the press-fitted tooth part 38A press-fitted to the external teeth 14 of the external gear 10 and the loose-fitted tooth part 38B loosely fitted with a clearance to the external gear 10, the load needed for press-fitting between the external gear 10 and the base plate 30 and the circumferential play therebetween are both reduced optimally or minimized. Further, since the press-fitted tooth part 38A is provided at intervals of about 120 degrees, the press-fitting operation is stabilized or balanced in addition to the reduction in the pressing load and the circumferential play.

Since the raised portion 36 is formed in the base face of the base plate 30, the clearance between the side face 13 of the external gear 10 and the base plate 30 is reduced or minimized.

When the seat reclining apparatus is subjected to a large load, the load is born by all the teeth of the external gear 10 that is fitted to the base plate 30. This is advantageous for strengthening the coupling between the base plate 30 and the external gear 10.

When the seat reclining apparatus is exposed to a large load, the raised portion 36 of the base plate 30 prevents the external gear 10 from axially moving off from the internal gear 20 so that the width of meshing between the external gear 10 and the internal gear 20 is held and the strength of coupling thereof is held.

Since the raised portion 36 of the base plate 30 is formed by embossing, the root of the tooth portion is provided with chamfers, and thereby the raised portion 36 serves for preventing stress concentration in the base plate 30, and enhancing the lifetime of the mold.

Figure 7:
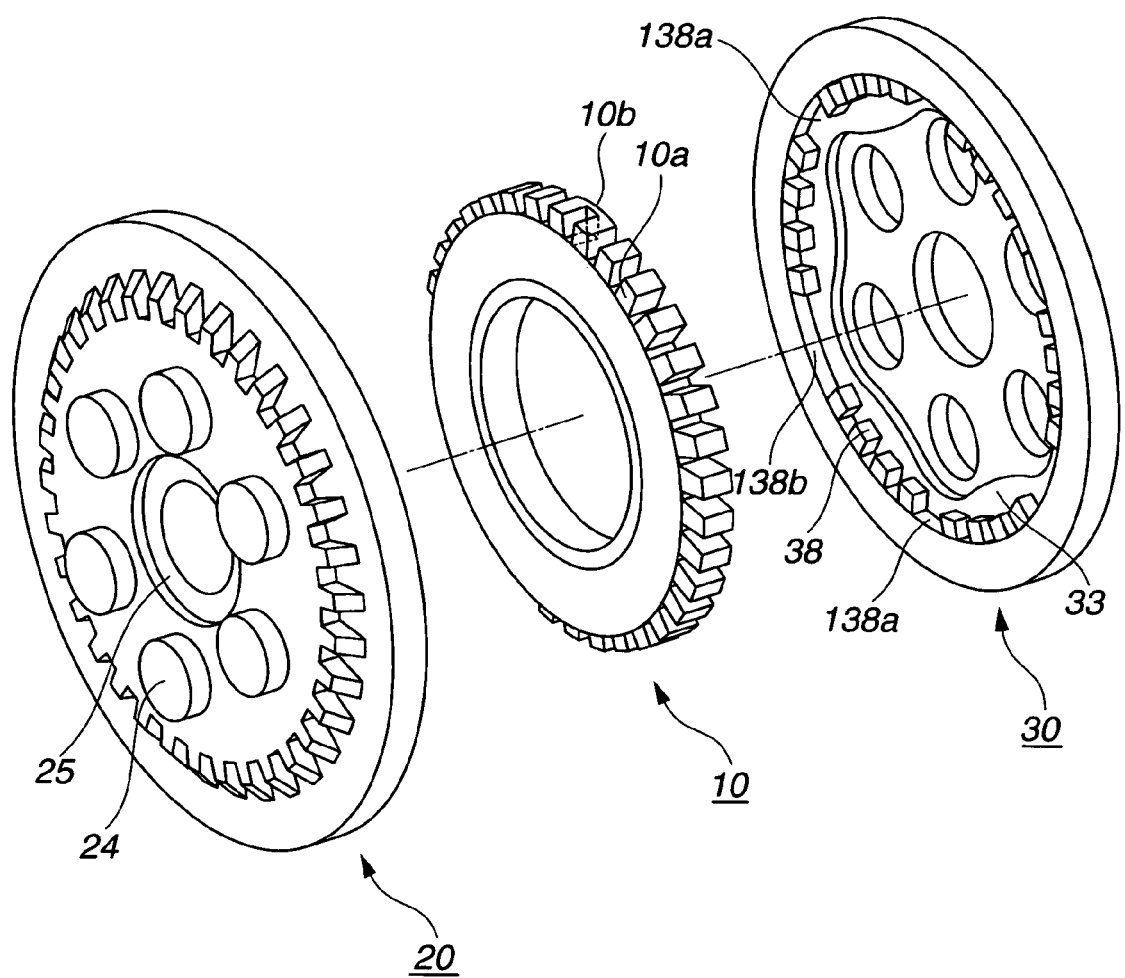
FIG. 7 is an exploded perspective view of a seat reclining apparatus in accordance with a modified embodiment of the present invention, where an internal gear, an external gear, and a base plate are shown.
Figure 8:
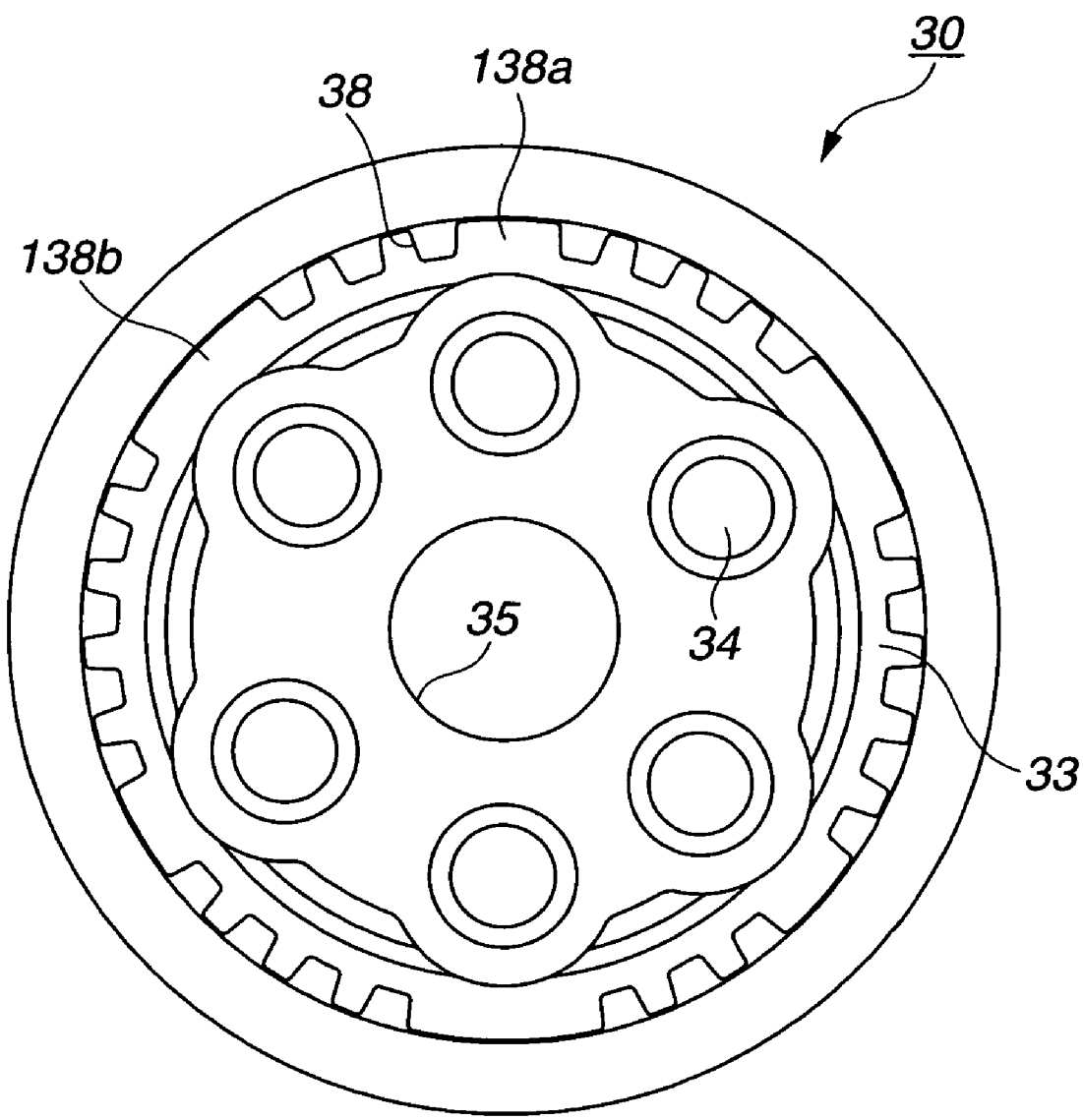
FIG. 8 is an isolated plan view of the base plate of the seat reclining apparatus of FIG. 7 taken similarly as in FIG. 3.

The following describes a seat reclining apparatus in accordance with a modified embodiment with reference to FIGS. 7 to 11B. In this embodiment, as shown in FIGS. 7 and 8, the internal tooth portion 38 of the base plate 30 includes three blank parts 138a from each of which one tooth is removed, and blank parts 138b from each of which two teeth are removed. The blank parts 138a and 138b are arranged alternately along the circumference.

On the other hand, as shown in FIG. 7, the external gear 10 includes a joined tooth part 10b at its press-fitted side which is formed by bridging one gap between two adjacent teeth to be fitted to the blank part 138a. The joined tooth part 10b may be inserted into the blank part 138b. The external gear 10 is formed by press forming so that as shown in FIG.

9 the external gear 10 includes a shear-dropped peripheral portion 10a at its meshed side.

Figure 9:
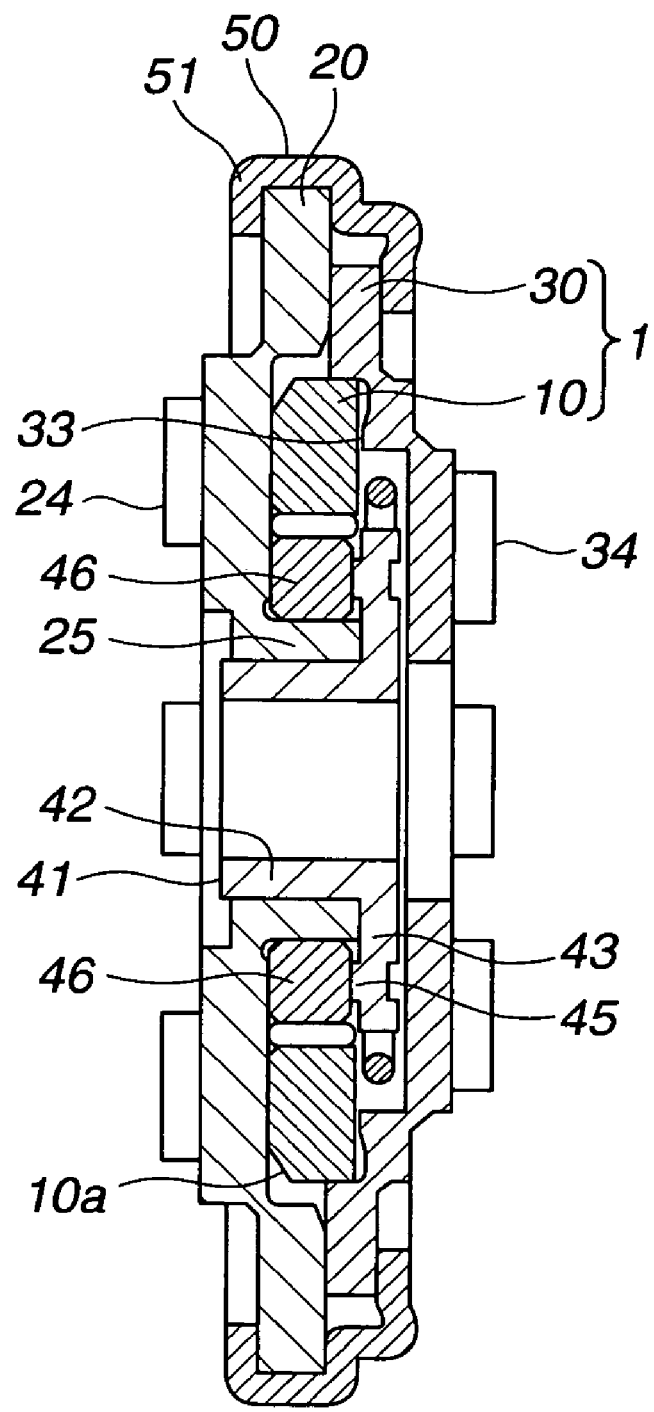
FIG. 9 is a sectional view of the seat reclining apparatus taken similarly as in FIG. 4.

The following describes a process of assembly of the seat reclining apparatus. First, as shown in FIG. 10, the external gear 10 is meshed with the internal gear 20, and the pair of lock plates 46 is disposed within the eccentric space 4. Second, as shown in FIGS. 1 and 9, the lock spring 47 and the center shaft 41 are installed, and then the external gear 10 is press-fitted to the internal tooth portion 38 of the base plate 30. At this time, as shown in FIG. 7, the joined tooth part 10b formed on the press-fitted side of the external gear 10 is disposed in the blank part 138a or 138b of the internal tooth portion 38 of the base plate 30. Then, the holder ring 50 is disposed to cover the outer periphery of the internal gear 20 and the base plate 30, and is formed with the side face 51 by drawing.

When the external gear 10 is incorrectly mounted in the above process of assembly in such a manner that the press-fitted side and the meshed side is reversed, the joined tooth part 10b of the external gear 10 is in an incorrect position on the meshed side. As a result, when the seat reclining apparatus is checked by rotating the meshing site H where the external gear 10 meshes the internal gear 20, the joined tooth part 10b prevents the meshing with the internal gear 20 so that the meshing site H moves no more. At this time, it is detected that the external gear 10 is incorrectly mounted.

In case the external gear 10 is formed by press forming, the incorrect assembly that the shear-dropped peripheral portion 10a is inserted into and press-fitted to the base plate 30 may cause a decrease in the strength of coupling due to a decrease in the length of contact. The seat reclining apparatus of this embodiment, however, prevents this problem as described above.

Although the external gear 10 includes a single joined tooth part 10b adapted to be fitted to the blank part 38a or 38b of the base plate 30 in this embodiment, the external gear 10 may include a plurality of joined tooth parts adapted to be fitted to the blank part 38a or 38b of the base plate 30. In that case, when the external gear 10 is incorrectly mounted, one of the joined tooth parts 10b is located at the meshing site H, preventing incorrect assembly without the above inspection by rotation. This is effective for omitting the inspection process and reducing the number of scrap parts. Although the base plate 30 is secured to the seatcushion arm 70 in this embodiment, the base plate 30 may be secured to the seatback arm 60 while the internal gear 20 may be secured to the seatcushion arm 70.

This application is based on prior Japanese Patent Application Nos. 2005-168949 filed on Jun. 9, 2005, 2005-168950 filed on Jun. 9, 2005, and 2005-220451 filed on Jul. 29, 2005. The entire contents of these Japanese Patent Application Nos. 2005-168949, 2005-168950, and 2005-220451 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A seat reclining apparatus comprising:
an internal gear adapted to be secured to one of a seatback and a seatcushion;
an external gear including an external tooth portion being in meshing contact with the internal gear, the external tooth portion having a smaller number of teeth than the internal gear;
an eccentric drive mechanism adapted to rotate the external gear with respect to the internal gear in meshing contact with the internal gear; and
a base plate adapted to be secured to another of the seatback and the seatcushion, the base plate including an internal tooth portion press-fitted to the external tooth portion of the external gear, and the internal tooth portion of the base plate comprising a part press-fitted to the external tooth portion of the external gear and a part loose-fitted to the external tooth portion of the external gear.

2. The seat reclining apparatus as claimed in claim 1, wherein the internal tooth portion of the base plate includes a plurality of the press-fitted parts arranged circumferentially and spaced substantially uniformly.

3. The seat reclining apparatus as claimed in claim 2, wherein the press-fitted parts of the internal tooth portion of the base plate are arranged circumferentially at intervals of about 120 degrees.

4. The seat reclining apparatus as claimed in claim 1, wherein the base plate includes a cylindrical hollow where the internal tooth portion is formed, and wherein the base plate includes a raised portion formed on a bottom of the cylindrical hollow, the raised portion extending to the external gear.

5. The seat reclining apparatus as claimed in claim 4, wherein the base plate further includes a hexagonal hollow formed in the bottom of the cylindrical hollow, and wherein the raised portion is formed on each of six edges defining the hexagonal shape of the hexagonal hollow.

6. The seat reclining apparatus as claimed in claim 4, wherein the base plate includes a chamfering formed between the bottom of the cylindrical hollow and the internal tooth portion, and wherein the raised portion of the base plate is formed extending higher toward the external gear than the chamfering.

7. The seat reclining apparatus as claimed in claim 4, wherein the raised portion of the base plate is formed by embossing.

8. The seat reclining apparatus as claimed in claim 1, wherein the external gear includes a joined tooth part comprising at least two teeth of the external tooth portion and a portion bridging at least one gap between the at least two teeth on a side press-fitted to the base plate, and wherein the internal tooth portion of the base plate includes a blank part accommodating the joined tooth part of the external gear.

9. The seat reclining apparatus as claimed in claim 8, wherein the external gear includes a plurality of the joined tooth parts, and wherein the internal tooth portion of the base plate includes a plurality of the blank parts each accommodating a respective one of the joined tooth parts of the external gear.

10. The seat reclining apparatus as claimed in claim 8, wherein the external gear is formed by press forming, and wherein the external gear includes a shear-dropped peripheral portion on one side and the joined tooth part on another side.

* * * * *